(12) United States Patent  
Nakagawa et al.

(10) Patent No.: US 6,561,484 B2
(45) Date of Patent: May 13, 2003

(54) GATE VALVE

(75) Inventors: Masaharu Nakagawa, Tokyo (JP); Hiroshi Minamoto, Tokyo (JP); Manabu Yabe, Tokyo (JP); Yuuzou Hayashi, Tokyo (JP); Norikimi Irie, Tokyo (JP)

(73) Assignee: Irie Koken Co., Ltd., Tokyo (JP)

( * ) Notice: Subject to any disclaimer, the term of this patent is extended or adjusted under 35 U.S.C. 154(b) by 0 days.

(21) Appl. No.: 09/964,339

(22) Filed: Sep. 28, 2001

(65) Prior Publication Data

US 2002/0074534 A1 Jun. 20, 2002

(30) Foreign Application Priority Data

Dec. 14, 2000 (JP) ........................................ 2000-380578

(51) Int. Cl.[7] ............................................... F16K 25/02
(52) U.S. Cl. ..................... 251/175; 251/196; 251/335.3
(58) Field of Search .................................. 251/193, 195, 251/196, 175, 327, 328, 329, 326, 335.3

(56) References Cited

U.S. PATENT DOCUMENTS

| | | | | | |
|---|---|---|---|---|---|
| 3,241,807 A | * | 3/1966 | Holderer | ................... | 251/175 |
| 3,524,467 A | * | 8/1970 | Worley | ................... | 251/175 |
| 4,157,169 A | * | 6/1979 | Norman | ................... | 251/195 |
| 4,381,100 A | * | 4/1983 | Schoenberg | ................ | 251/195 |
| 6,427,973 B1 | * | 8/2002 | Wagner | ................... | 251/175 |

\* cited by examiner

Primary Examiner—Ehud Gartenberg
Assistant Examiner—John Bastianelli
(74) Attorney, Agent, or Firm—Sughrue Mion, PLLC

(57) ABSTRACT

A gate valve according to the present invention including a first valve plate having a valve opening, a second valve plate connected to the first valve plate via first bellows, and an actuator provided between the first valve plate and the second valve plate, wherein the first valve plate is moved by the operation of the actuator, thereby enabling the valve plate, a valve rod, and the like to be made small and lightweight.

12 Claims, 19 Drawing Sheets

(Pa = Pb)

(Pa=Pb)

(Pa > Pb)

(Pa < Pb)

GATE VALVE

BACKGROUND OF THE INVENTION

1. Field of the Invention

The present invention relates to a gate valve and, more particularly, to improvements in which an actuator is provided between a pair of valve plates, and in which the valve plates are moved in the axial direction by the operation of the actuator so that the sealing operation can be achieved with a small sealing force, thereby allowing a reduction in the rigidity of the valve plates and a valve rod.

2. Description of the Related Art

Conventionally, structures of non-sliding vacuum gate valves disclosed in, for example, Japanese Unexamined Patent Application Publication Nos. 8-42715 and 10-110834, which are not shown, are generally adopted.

In non-sliding vacuum gate valves constructed in the conventional manner, the following problems occur:

Since one valve plate is vertically moved to open and close a valve of an opening of a valve casing, if the relationship between the pressure $P_0$, on the side of a valve plate 1 and the pressure $P_1$ on the side of a valve casing 50 satisfy the condition $P_1 > P_0$, the pressure $P_1$, is applied to an area Sa surrounded by sealing member 3 such that the valve plate 1 separates from a valve seat 4 as shown in FIG. 1.

A force f, where $f = (P_1 - P_0) \cdot Sa$, is applied and it becomes necessary to add the value f to the sealing force, which is originally required, in order to achieve the operating force required for the valve closing (sealing) operation. Therefore, the valve plate and the valve-plate driving section are required to have a large weight and high rigidity, and consequently, the structure of the gate valve itself becomes so large and complicated that it is difficult to manufacture at a low cost.

SUMMARY OF THE INVENTION

The present invention has been made to solve the above problems. Accordingly, it is an object of the present invention to provide a gate valve in which a pair of valve plates have an actuator therebetween to move the valve plates in the axial direction by the operation thereof, thereby performing a sealing operation with a small sealing force, and allowing a reduction in the rigidity of the valve plates and a valve rod.

A gate valve according to the present invention comprises: a first valve plate having a valve openings; a second valve plate connected to the first valve plate via expandable body; and an actuator provided between the first valve plate and the second valve plate, wherein, preferably, the first valve plate is moved by the operation of the actuator, the first valve plate is provided with a valve rod, the second valve plate is provided with the valve rod, the valve rod is located at the center of the expandable body in the axial direction, the actuator comprises an air cylinder, the actuator is surrounded by dustproof bellows provided between the valve plates, the air cylinder comprises a piston, a piston rod, and a cylinder, which are provided at the valve plates, a pressure medium is supplied to a space formed between the piston and the cylinder, and the first valve plate is provided with first sealing member. The gate valve according to the present invention further comprises: a valve casing for enclosing the valve plates in a manner which allows them to be freely moved; a first valve seat formed in a first opening of the valve casing, with which the first sealing member come into contact; and a first stopper formed in the second opening of the valve casing, with which the second valve plate comes into contact. A gate valve according to the present invention, further comprises: a valve casing for enclosing the valve plates in a manner which allows them to be freely moved; a first sealing member formed in the first opening of the valve casing, with which the first valve plate comes into contact; and a first stopper formed in the second opening of the valve casing, with which the second valve plate comes into contact. A gate valve according to the present invention, further comprises: a valve casing for enclosing the valve plates in a manner which allows them to be freely moved; a first valve seat formed in the first opening of the valve casing, with which the first sealing member comes into contact; and a second stopper which protrudes from the second valve plate, which is located on the inside or outside of the expandable body, and which comes into contact with the valve casing on the side of the first opening. A gate valve according to the present invention, further comprises: a valve casing for enclosing the valve plates in a manner which allows it to be freely moved; a first valve seat formed in the first opening of the valve casing, with which the first sealing member comes into contact; and a second stopper which extends to the inner wall of the valve casing, which is located on the outside of the expandable body, and which comes into contact with the first valve plate.

DESCRIPTION OF THE PREFERRED EMBODIMENTS

Figure 1:
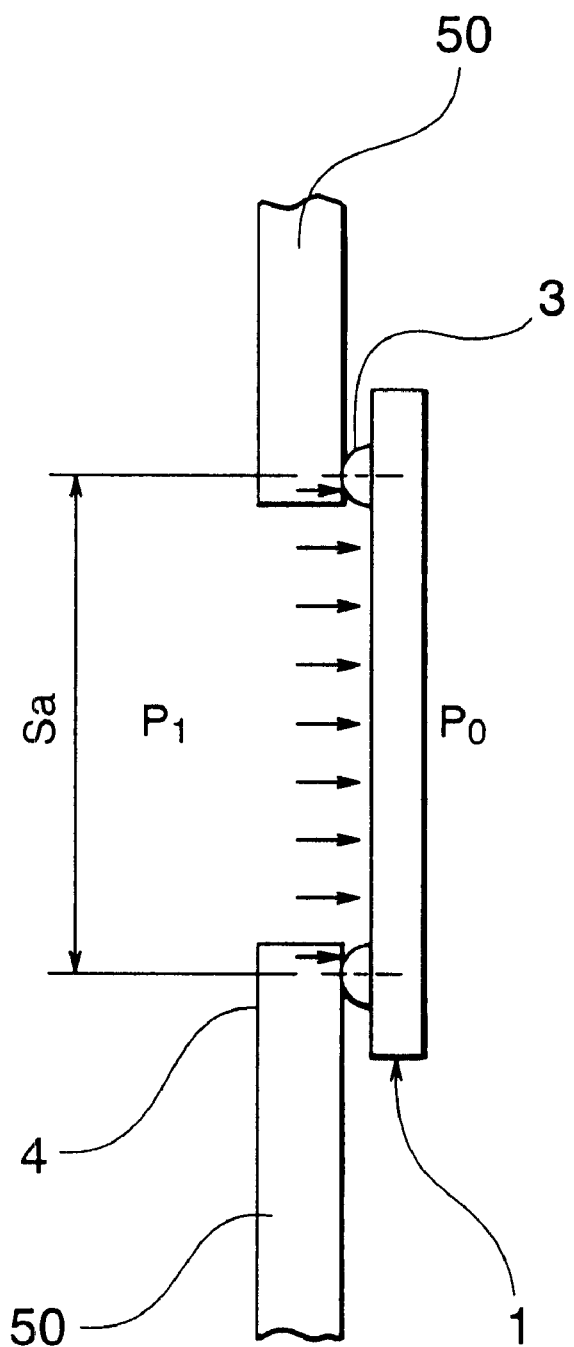
FIG. 1 is a structural view showing a state in which a conventional gate valve is closed.

Preferred embodiments of a gate valve according to the present invention will be described hereinbelow with reference to the drawings.

Parts which are similar to or correspond to parts in the conventional art are given like reference numerals throughout the description.

Figure 2:
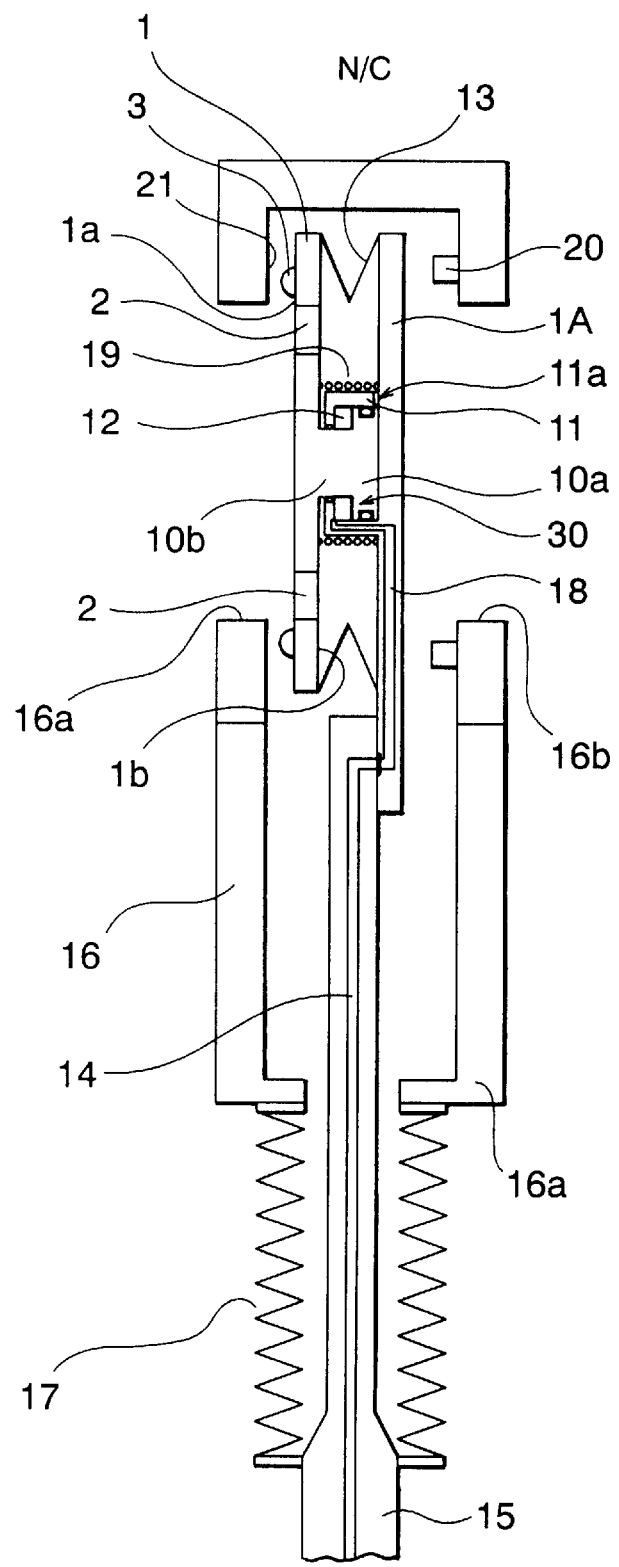
FIG. 2 is a cross sectional view of a gate valve according to the present invention.

In FIG. 2, reference numeral 1 denotes a first valve plate, in which valve openings 2 are formed, and first sealing member 3 is formed on an outer surface 1a thereof.

A piston 10a and a piston rod 10b, which have a T-shape in cross section, are formed at the center of an inner surface 1b of the first valve plate 1. The piston 10a has a cylinder 11 having a cylindrical shape and having a breathing hole 11a coaxially disposed at the outer periphery thereof in a manner which allows it to be freely operated.

A space 12 is formed between the piston rod 10b and the cylinder 11 at which a second valve plate 1A is integrally formed, and the valve plates 1 and 1A are airtightly connected to each other with an expandable body 13. The expandable body 13 is composed of bellows or the like. Although the cylinder 11 as shown in FIGS. 2, 3, 5, 6, and 7 is provided at the second valve plate 1A, a case in which the cylinder is integrally formed at the first valve plate 1 to open and close the valve also falls within the scope of the present invention.

A valve rod 15 having a first guide path 14 is integrally or separately connected to the lower part of the second valve plate 1A, the valve rod 15 being connected, via second bellows 17, to a lower section 16a of a valve casing 16 for holding the valve plates 1 and 1A while allowing them to move in a manner which allows it to be freely operated.

The first guide path 14 is connected to the space 12 to communicate therewith via a second guide path 18 formed in the second valve plate 1A, and the cylinder 11 is provided with spring 19 each including a compressed spring at the outer periphery thereof. Since the resilience of the spring 19 is always in the expanding direction, the valve plates 1 and 1A are normally expanded to form a normally closed (N/C) state in which a first opening 16a of the valve casing 16 is usually closed. The piston 10a, the piston rod 10b, the cylinder 11, and the space 12 are assembled to form an actuator 30.

First stopper 20 is formed at the inner wall of a second opening 16b of the valve casing 16.

When the valve plates seal the two spaces having differential pressure therebetween, there appears two kind of sealing. One is positive-pressure sealing, wherein the differential pressure works in the direction of a seat of the valve plate, and the other is counterpressure sealing, wherein the differential pressure works in the direction so as to separate the valve plate from the valve seat.

In the case of counterpressure sealing of the gate valve in FIG. 2, the pressure on the side of a seat (chamber) is introduced through the valve openings 2 of the first valve plate 1, and a pressure difference between the inside of the valve plate and the outside of the valve plate corresponding to an effective pressure-receiving area of the bellows, is applied to the second valve plate 1A, and consequently, the distance between the first valve plate 1 and the second valve plate 1A is increased by a specified amount so that the second valve plate 1A comes into contact with the first stopper 20 of the valve casing 16. Thus, the force of the differential pressure which is originally to be applied to the first valve plate 1, and which is applied to the effective pressure-receiving area of the bellows, is cancelled by the first valve plate 1 and is transferred to the second valve plate 1A, and is then received by the first stopper 20.

In addition, a similar result can be obtained not only when the first sealing member 3 is mounted on the first valve plate 1 as in FIG. 2, but also when the first sealing member 3 is mounted on the side of a first valve seat 21 of the valve casing 16 as in FIGS. 10 to 13.

Also, by changing the effective pressure-receiving area of the second bellows 17, the ratio of the pressure which cancels the differential pressure applied to the first valve plate 1 can also be changed.

In this instance, when the differential pressure is generated between inside and outside of the bellows, a force is generated in the direction for expanding the bellows, wherein, the effective pressure-receiving area is the area which gives the force generated in the direction of expansion, when multiplied by the differential pressure.

Accordingly, as shown in FIG. 2, the differential pressure generated at the second valve plate 1A on the non-sealing side is received by the first stopper 20 such that the differential pressure, which increases in proportion to the opening area, is cancelled, thus allowing the valve plates and the valve driving section, which required high rigidity in the conventional art, to be lightweight and to have low rigidity.

In the above structure, when a pressure medium (air or oil) which is fed from a pressure source (not shown) is supplied to the space 12 through the guide paths 14 and 18, the volume of the space 12 is increased, the distance between the valve plates 1 and 1A is decreased, and the first sealing member 3 is separated from the valve seat 21 of the valve casing 16, and the first valve opening 16a is opened.

In addition, when the supply of the pressure medium to the space 12 is suspended and the pressure medium is exhausted, the first valve plate 1 is moved by the resilience of the spring 19 such that the first sealing member 3 is brought into contact with the valve seat 21, thereby performing a valve closing operation.

Accordingly, the first opening 16a of the valve casing 16 is opened and closed merely by moving the first valve plate 1 in the axial direction. Since no force is applied to the first valve plate 1 in the direction in which the first valve plate 1 and the valve seat 21 are separated due to the pressure difference between the first opening 16a and the second opening 16b, sealing can be performed with an extremely small force. A large force resulting from the differential pressure is not generated at the first valve plate 1, but is generated at the second valve plate 1A. However, since the first stopper 20 receives the force, no functional problems occur even if the second valve plate 1A is deformed. Accordingly, the first valve plate 1 and the second valve plate 1A are not required to be rigid, and can be made lightweight. Consequently, since the driving load of the valve rod 15 and the like for moving the valve plates 1 and 1A, which can be made lightweight, is remarkably reduced, the valve rod and the like can be made smaller and lightweight.

Subsequently, the principle of canceling the differential pressure in the above structure will be specifically described hereinbelow.

Figure 19:
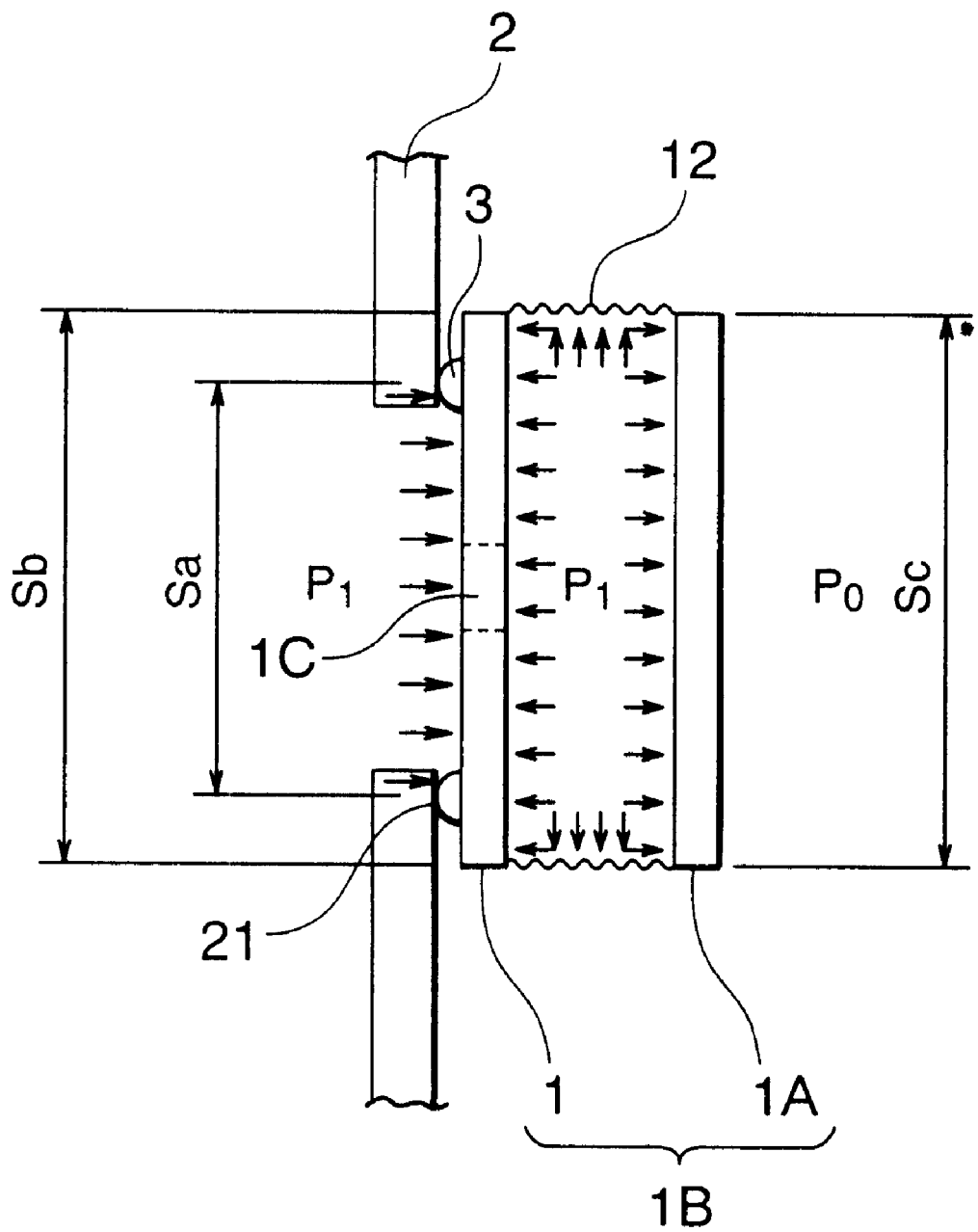
FIG. 19 is a structural view showing the operation of the gate valve in FIG. 2.

Valve closing operation of the differential pressure canceling structure will be described with reference to FIG. 19.

The first valve plate 1 has a valve opening 1c (the section indicated by dotted line). However, in FIG. 19, the valve opening 1c is closed and the pressure in a valve unit 1B is set to $P_1$ for the purpose of simplifying the description of the calculation of the differential pressure applied to the first valve plate 1, while the first valve plate 1 is under the same conditions as in the case of having the valve opening 1c.

$$P_1 > P_o$$

Sa: Area surrounded by the first sealing member 3

Sb: Effective pressure-receiving area to which the pressure $P_1$ is applied in the valve unit 1B in the direction in which the first valve plate 1 is brought to the seat and the dimension is determined depending on first bellows 12.

Sc: Effective pressure-receiving area to which the pressure $P_1$ is applied in the valve unit 1B in the direction in which the second valve plate 1A is separated from the seat face and the dimension is determined depending on the first bellows 12.

In the first valve plate 1, the pressure $P_1$ is applied to the pressure-receiving area Sa in the direction in which the first valve plate 1 is separated from the valve seat 21 and, at the same time, the pressure $P_1$ is applied to the pressure-receiving area sb surrounded by the first bellows 12 in the valve unit 1B in the direction of sealing.

Here, if the differential pressure that is applied to the first valve plate 1 by the pressure $P_1$ (in the direction separating from the valve seat) is f, $$f = (P_1 - P_o) \cdot (Sa - Sb)$$

When f>0, f is applied in the direction in which the first valve plate 1 and the valve seat 21 are separated from each other.

When f<0, f is applied in the direction in which the first valve plate 1 and the valve seat 21 are pushed to each other. Accordingly, the differential pressure applied to the pressure-receiving area Sa of the first valve plate 1 can be reduced (cancelled) by pressure corresponding to the pressure-receiving area Sb. While Sa should be a fixed value in product specifications, the value Sb is varied so that the pressure at which the differential pressure is cancelled can freely be set.

On the other hand, assuming that the first bellows 12 is not deformed (swollen) in a direction perpendicular to the direction of expansion, (as shown in the case where the inner part constructed by an expandable member has a uniform and parallel cylindrical shape), the following equation:

$$Sb = Sc$$

is obtained. The pressure $P_1$ in the valve unit 1B is applied to the pressure-receiving area Sc of the second valve plate 1A so as to separate the second valve plate 1A from the seat. The second valve plate 1A, which receives the pressure, is separated from the first valve plate 1 and is moved a specified distance due to the expansion of the first bellows 12. However, the second valve plate 1A is brought into contact with a stopper (not shown) to absorb the differential pressure.

In this case, although a reactive force associated with the expansion is generally generated in the first bellows 12, the strength is so small compared with f that it is ignored.

Figure 3:
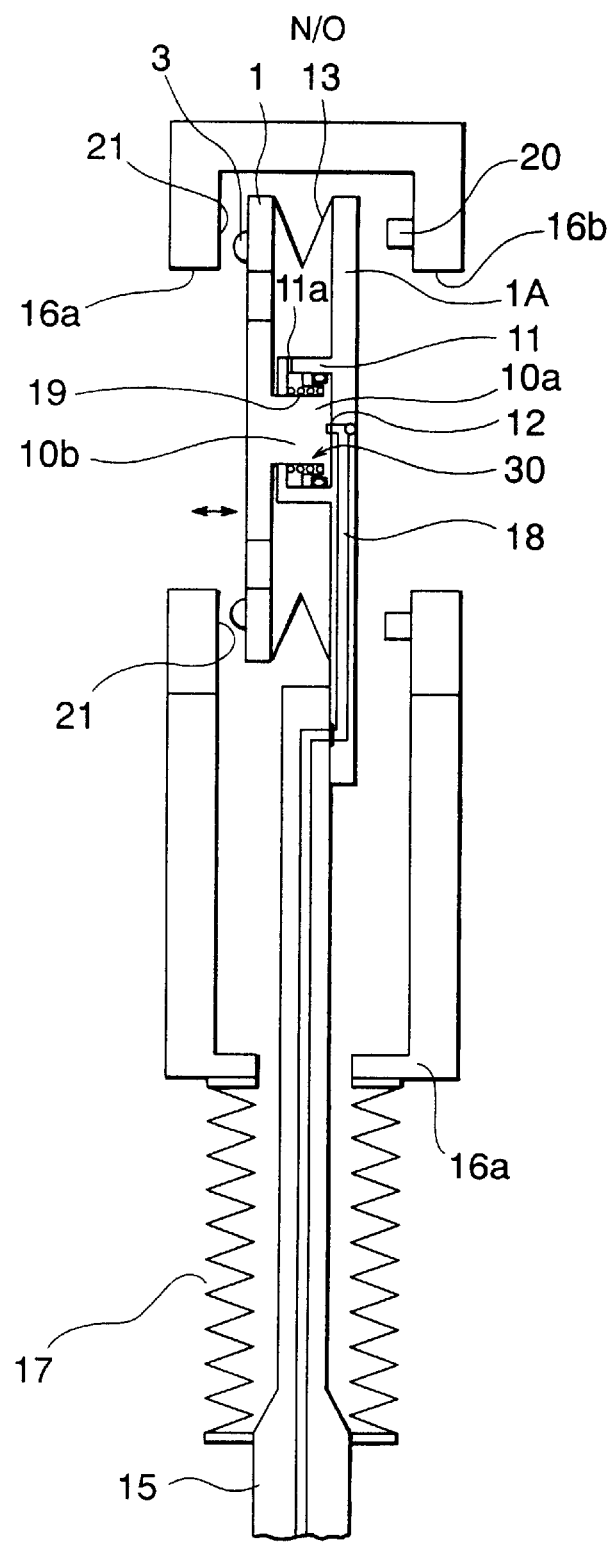
FIG. 3 is a cross sectional view showing another embodiment of the present invention in FIG. 2.
Figure 4:
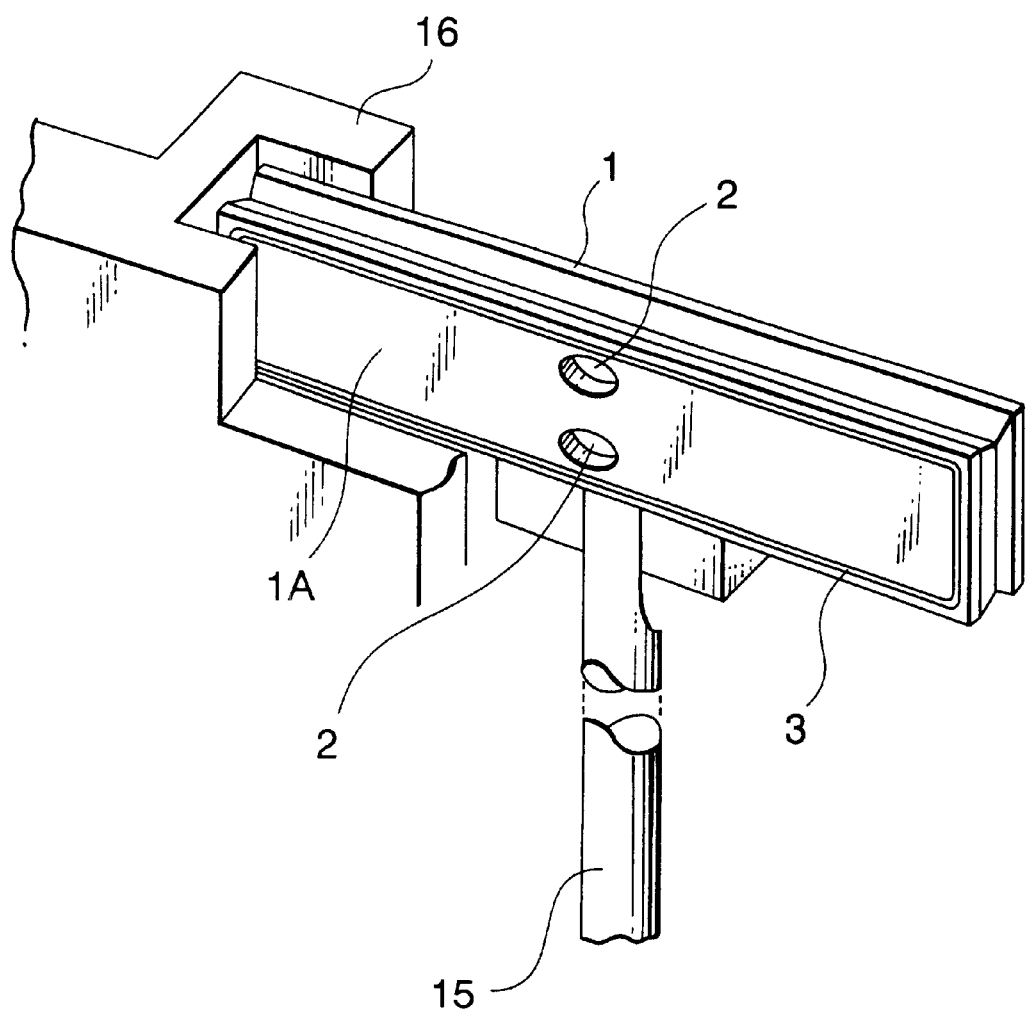
FIG. 4 is a perspective view showing the structure in FIG. 2.

FIG. 3 shows another embodiment of the present invention in FIG. 2. Since the spring 19 is located between the piston rod 10b and the cylinder 11 and at the outer periphery of the piston rod 10b, the first valve plate 1 is brought to the side of the second valve plate 1A by the resilience of the spring 19 so that the first opening 16a is constantly held in an opened state.

The second guide path 18 formed in the second valve plate 1A is connected to the space 12 to communicate therewith which is formed between the piston 10a and the second valve plate 1A. By supplying a pressure medium into the space 12, the piston 10a, the piston rod 10b, and the first valve plate 1 are moved toward the valve seat 21 from the second valve plate 1A, thereby closing the first opening 16a.

Figure 5:
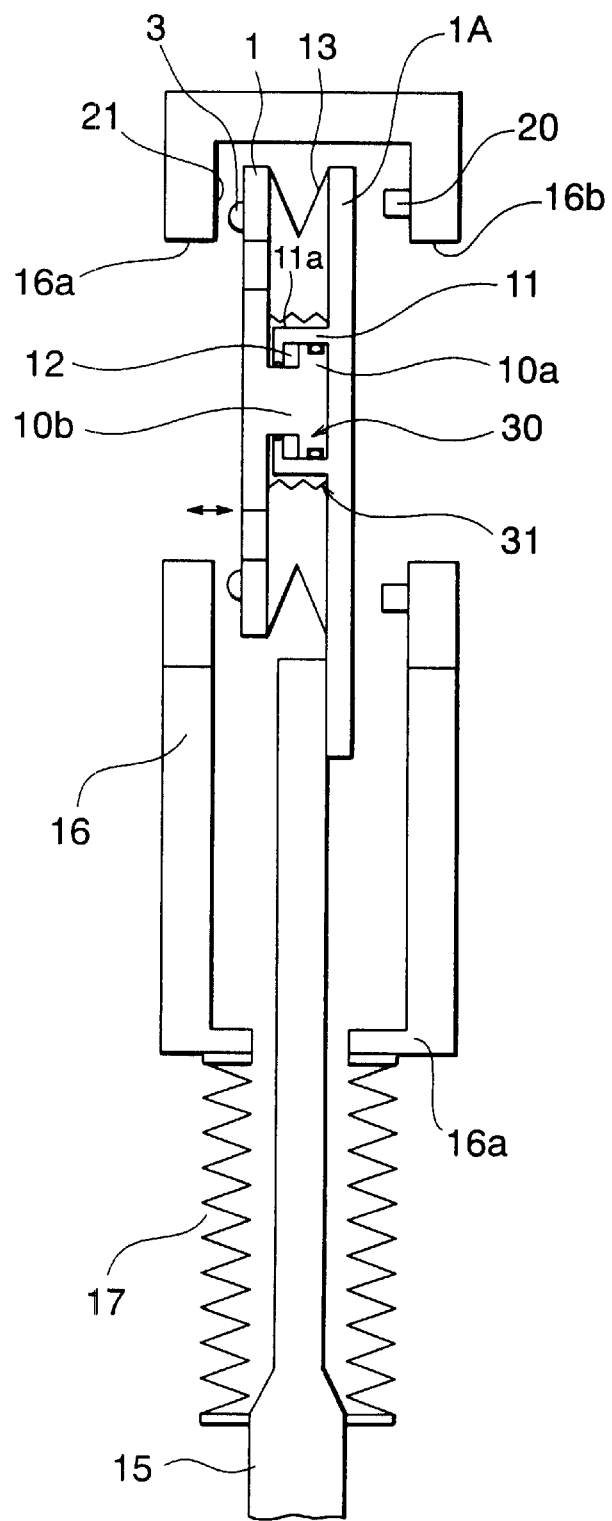
FIG. 5 is a cross sectional view of another embodiment of the present invention in FIG. 2.

FIG. 5 shows another embodiment of the present invention in FIG. 2, in which dustproof bellows 31 is provided at the outer periphery of the actuator 30.

Figure 6:
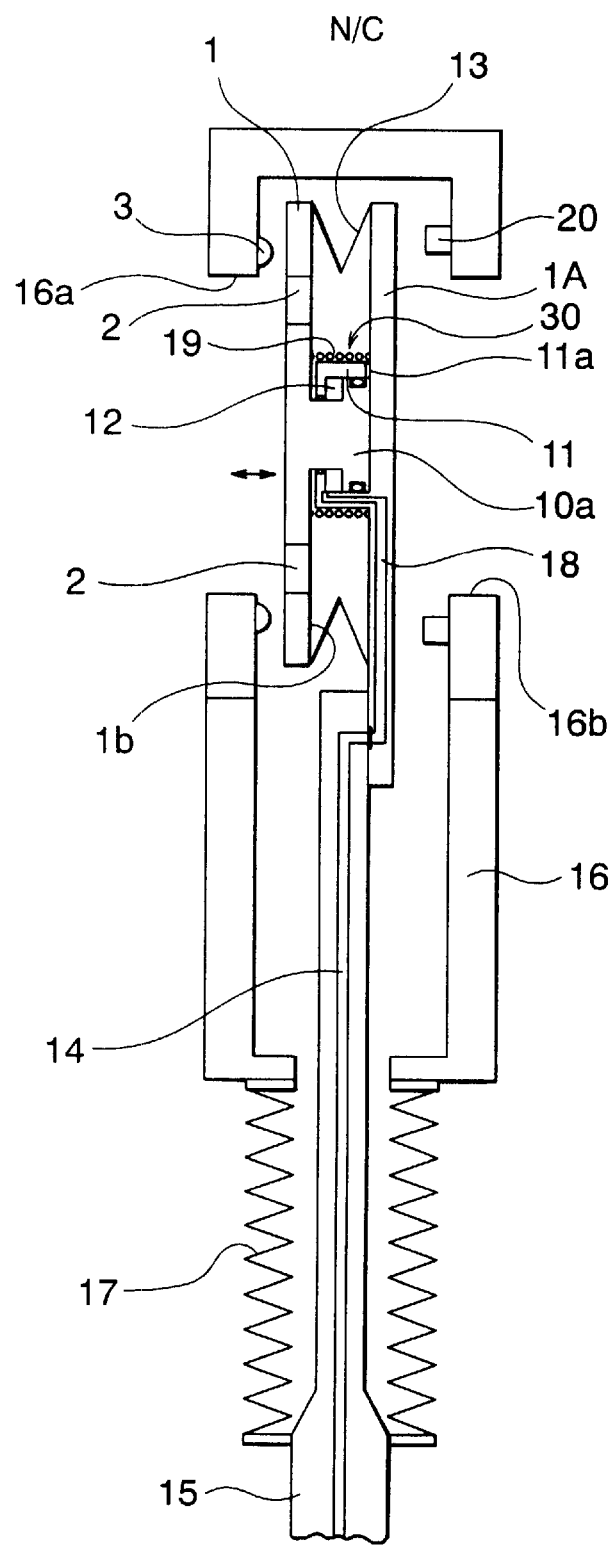
FIG. 6 is a cross sectional view of another embodiment of the present invention in FIG. 5.
Figure 7:
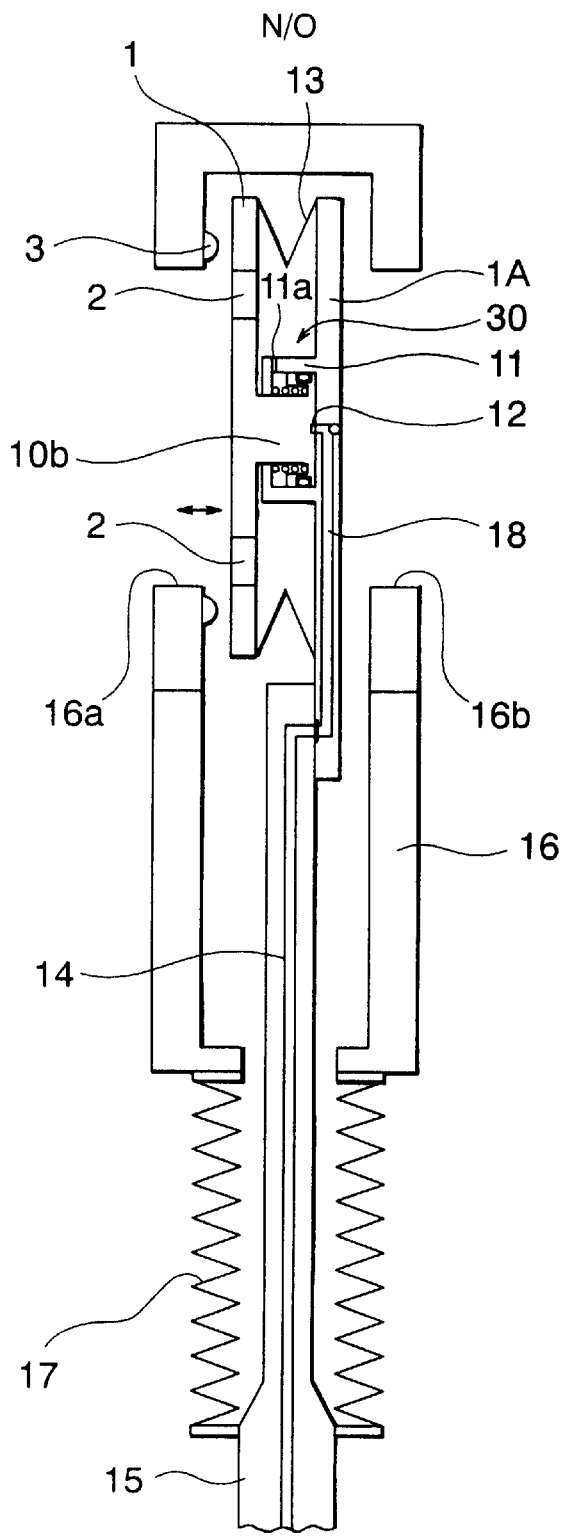
FIG. 7 is a cross sectional view of another embodiment of the present invention in FIG. 3.

FIGS. 6 and 7 show other embodiments of the present invention in FIGS. 2 and 3, in which the first sealing member 3 is provided at the valve casing 16.

Figure 8:
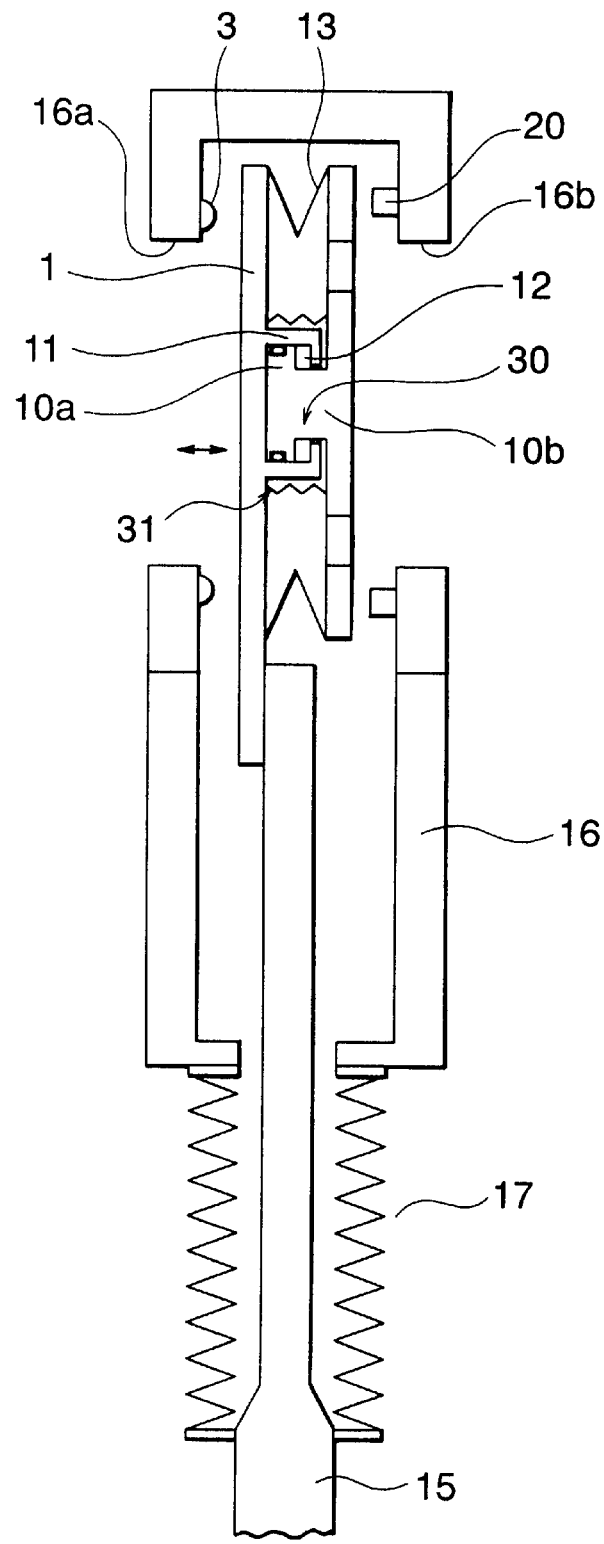
FIG. 8 is a cross sectional view of another embodiment of the present invention in FIG. 5.

FIG. 8 shows another embodiment of the present invention in FIG. 5, in which a double-acting cylinder 11 (a single body is shown in the drawings) is integrated with the first valve plate 1, the valve rod 15 is provided at the first valve plate 1, and the first sealing member 3 is provided at the valve casing 16.

Figure 9:
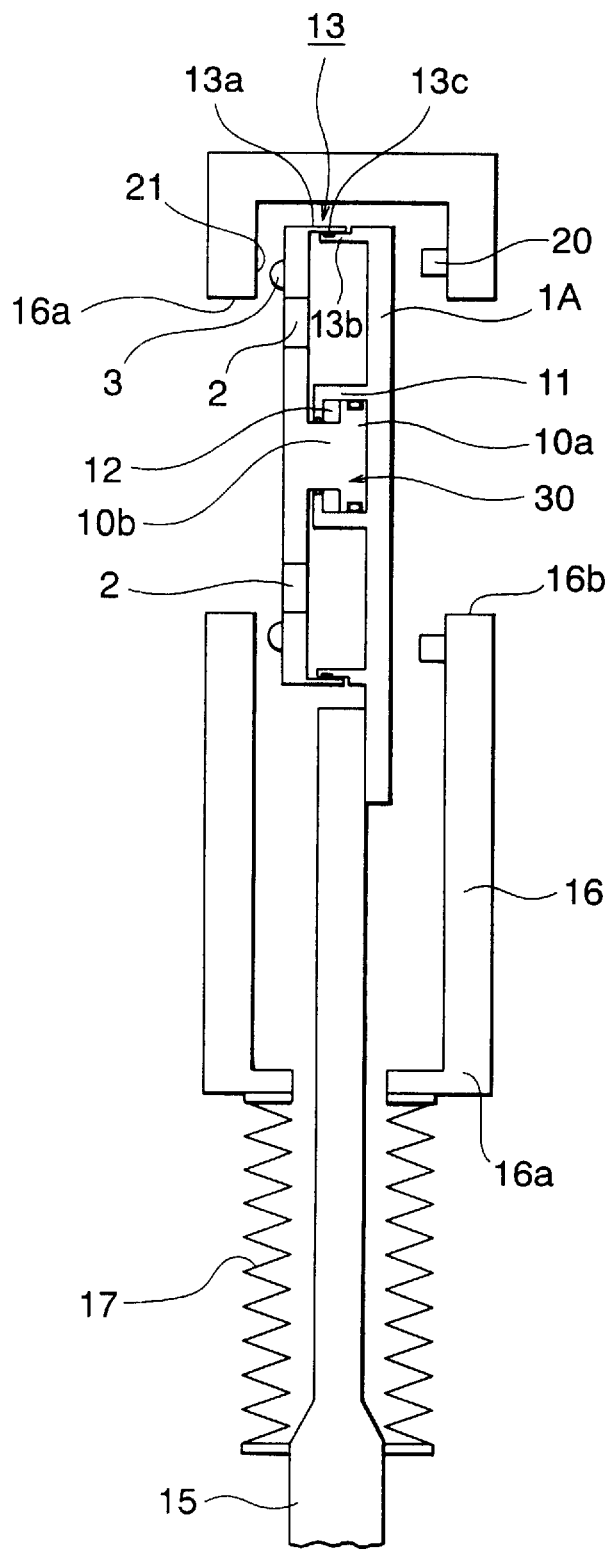
FIG. 9 is a cross sectional view of another embodiment of the present invention in FIG. 2.

FIG. 9 shows another embodiment in which a pair of cylinder sections 13a and 13b are constructed instead of the expandable member 13 which includes the bellows in the above embodiments, so as to slide via a seal 13c such that an effect similar to that obtained when bellows are used can be achieved.

In addition, in the above structures in FIGS. 6 to 9, parts similar to those in FIGS. 2 to 5 are denoted by the same reference numerals, and thus a description thereof is omitted.

Figure 10:
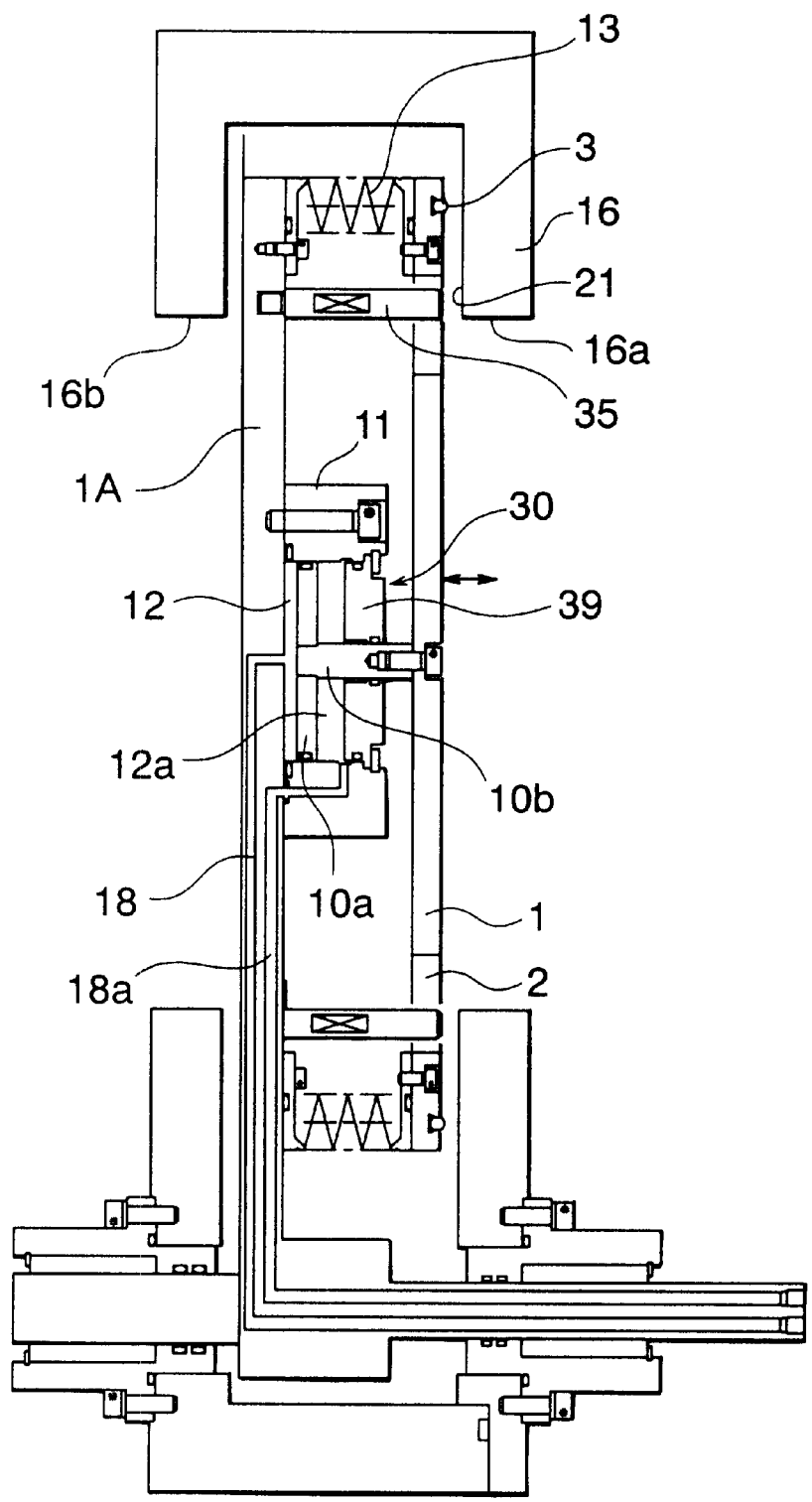
FIG. 10 is a cross sectional view of another embodiment of the present invention in FIG. 2.

A structure shown in FIG. 10 is another embodiment of the present invention in FIG. 2. Parts similar to those in FIG. 2 are denoted by the same reference numerals, and thus a description thereof is omitted, and only the parts which are different will be described.

Rod-shaped second stoppers 35, which are provided at the second valve plate 1A, are disposed on the inside of the expandable body 13 so as to extend in a direction perpendicular to the face of the second valve plate 1A and come into contact with the valve seat 21 of the valve casing 16 through the valve openings 2 of the first valve plate 1.

The actuator 30 is provided between the second valve plate 1A and the first valve plate 1. The actuator 30 includes the cylinder 11 which is fixed to the second valve plate 1A, the piston 10a which is provided in the cylinder 11 in a freely movable manner, the piston rod 10b for connecting the piston 10a and the first valve plate 1, a cover 39 which is provided at the cylinder 11, the first space 12 and a second space 12a which are formed on both sides of the piston 10a, and the guide paths 18 and 18a which are formed in the second valve plate 1A, and are respectively connected to the first space 12 and the second space 12a to provide passes of the pressure medium.

In the structure in FIG. 10, when the pressure medium is supplied to the first space 12 in order to move the first valve plate 1 to the right side, the first sealing member 3 of the first valve plate 1 come into contact with the valve seat 21 of the valve casing 16, and thus, the first opening 16a is closed.

When the pressure of the second opening 16b is higher than that of the first opening 16a, the differential pressure, corresponding to an effective pressure-receiving area of the expandable body 13, is applied to the second valve plate 1A and the force is applied in the direction in which the valve closes. However, since the second stoppers 35 come in contact with the valve seat 21, when the pressure medium is then supplied into the second space 12a to bring the first valve plate 1 to the initial position, the first valve plate 1 can easily be returned without a large force. Also in a state in which the valve is closed, since the force due to the differential pressure is not applied to the first valve plate 1 via the second valve plate 1A, excessive force which is larger than the output from the cylinder, which is required for sealing, is not applied to the sealing member 3, so that deformation and deterioration in performance of the sealing member can be prevented.

Figure 11:
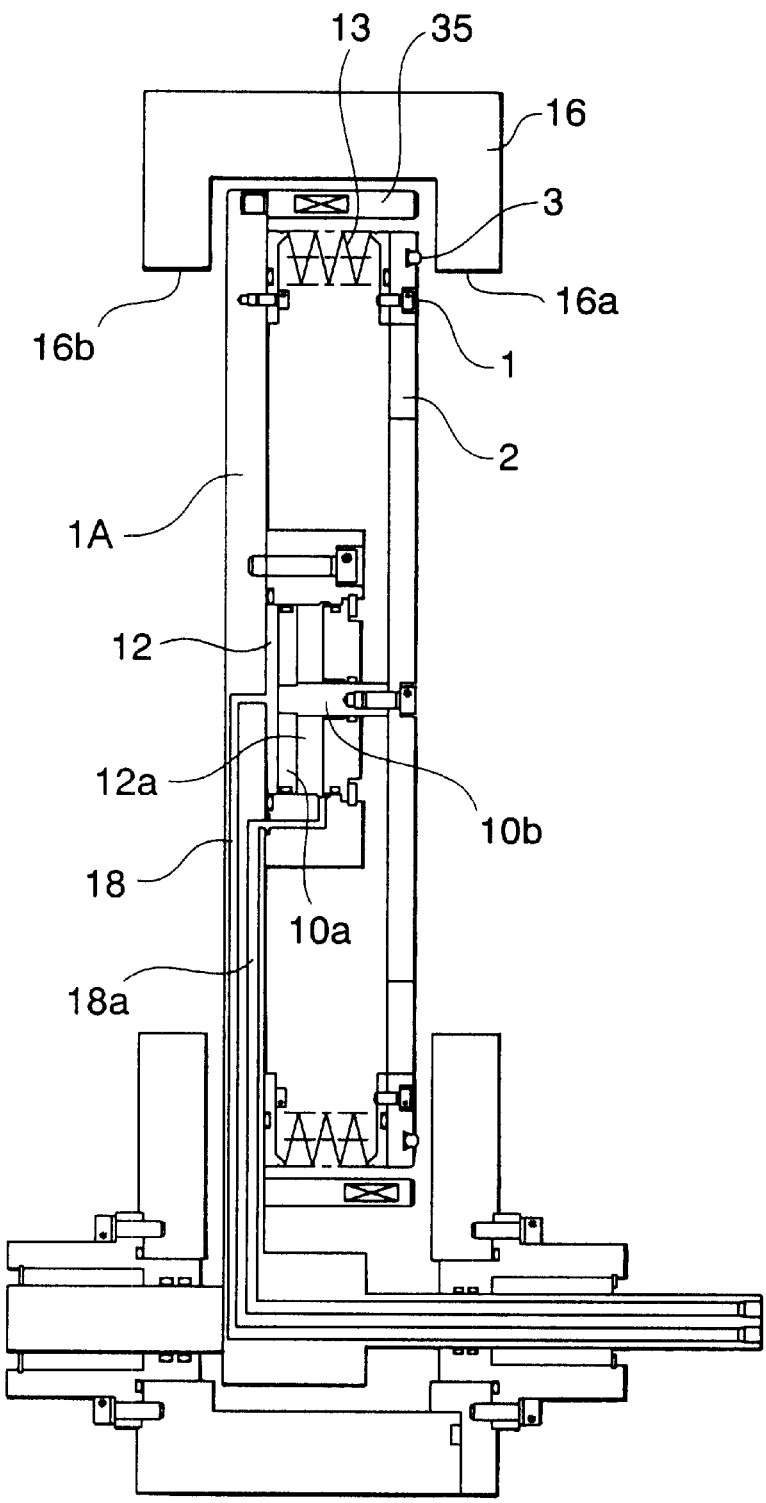
FIG. 11 is a cross sectional view of another embodiment of the present invention in FIG. 10.
Figure 12:
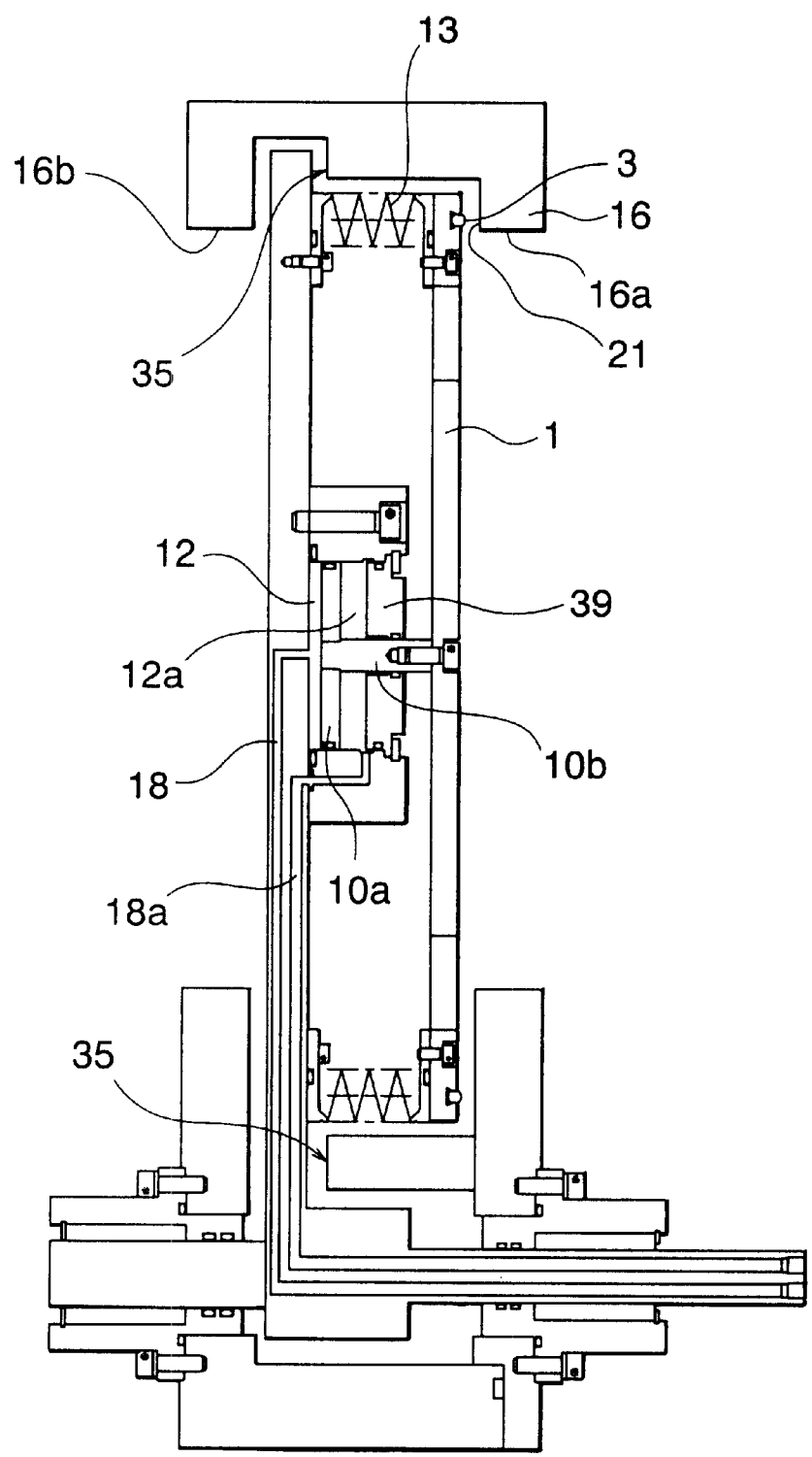
FIG. 12 is a cross sectional view of another embodiment of the present invention in FIG. 10.

FIG. 11 shows another embodiment of the present invention in FIG. 10, wherein, since the second stoppers 35 are located on the outside of the expandable body 13 and the structure and operation are identical to those in FIG. 6, like parts are given like reference numerals and a description thereof is omitted. FIG. 12 shows another embodiment of the present invention in FIG. 11, wherein the second stopper 35 is integrated with the valve casing 16.

Figure 13:
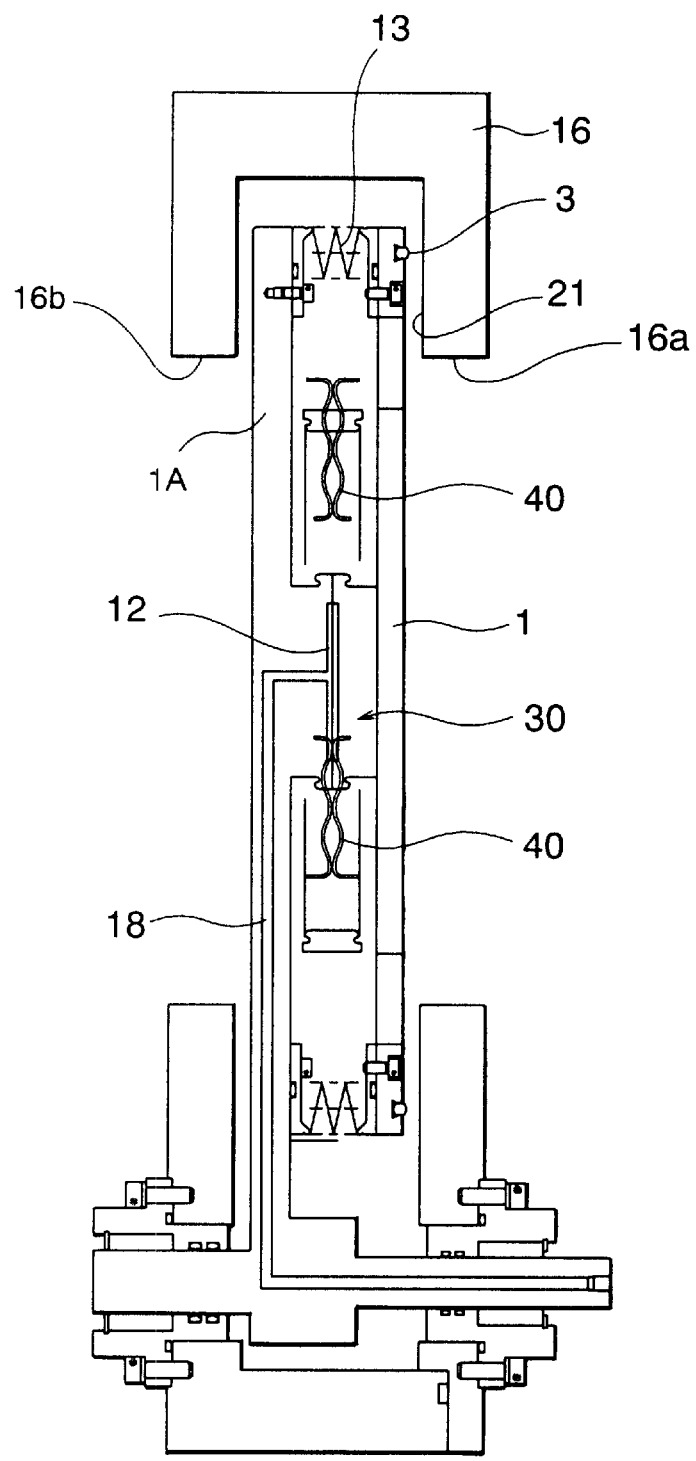
FIG. 13 is a cross sectional view of another embodiment of the present invention in FIG. 10.

FIG. 13 shows another embodiment of the present invention in FIG. 10. The actuator 30 does not have a cylindrical shape as described above, but includes a diaphragm 40. The supplied pressure medium enters the diaphragm 40 to open the valve plates 1 and 1A and the valve is closed. When the supply of the pressure medium is stopped and is then exhausted, the diaphragm 40 returns to the initial state and the valve is opened. Parts similar to those in FIG. 6 are denoted by the same reference numerals, and a description thereof is omitted.

Figure 14:
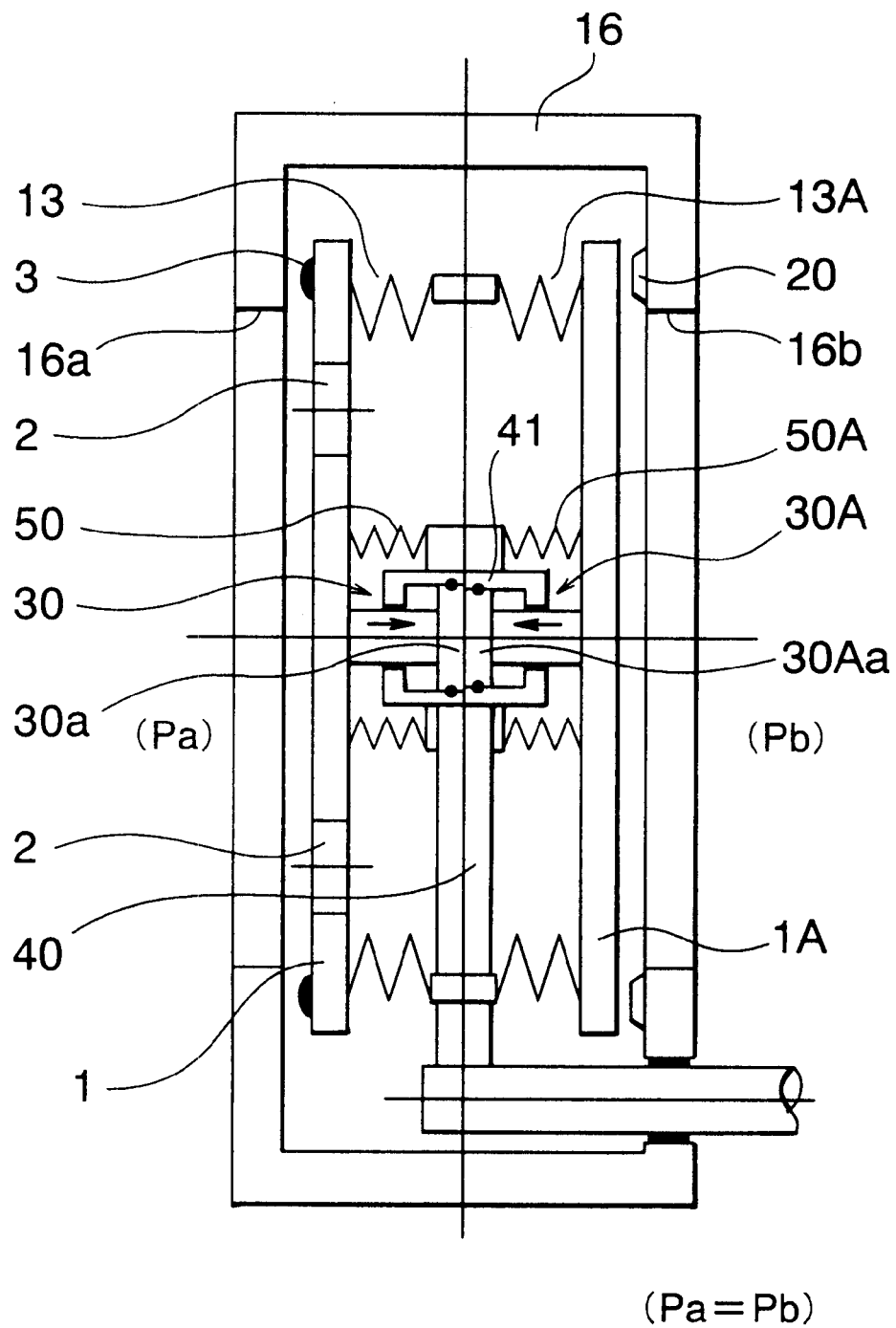
FIG. 14 is a cross sectional view of another embodiment of the present invention in FIG. 2.

FIG. 14 shows another embodiment of the present invention in FIG. 2, wherein a pair of cylindrical actuators 30 and 30A are disposed such that they face each other and a pipe body 40 which supplies a pressure medium for driving pistons 30a and 30Aa of the actuators 30 and 30A is connected thereto.

The actuators 30 and 30A are formed of a common cylinder 41, wherein the pistons 30a and 30Aa are connected to the pipe 40 via a pair of expandable body 13 and 13A, and a dustproof structure is formed with cylindrical dustproof bellows 50 and 50A at the outer periphery of the actuators 30 and 30A.

The structure in FIG. 14 shows a case in which the first opening 16a and the second opening 16b are in an opened state, and in which the pressure Pa=Pb, and in which the openings 16a and 16b are held at the same pressure.

Figure 15:
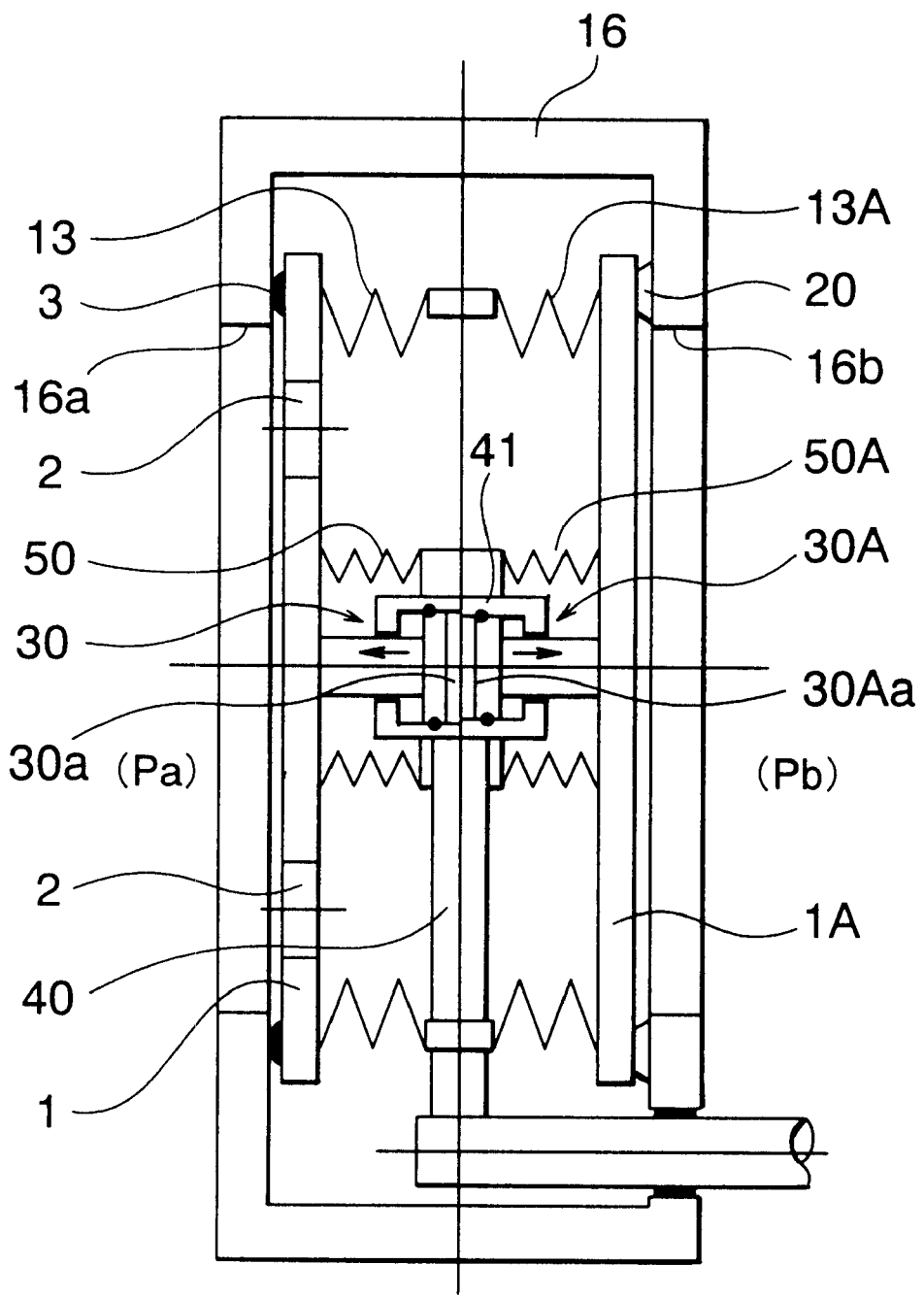
FIG. 15 is a cross sectional view showing a case of constant pressure sealing of the present invention in FIG. 14.

FIG. 15 shows another state of the structure in FIG. 14, wherein the pistons 30a and 30Aa of the actuators 30 and 30A are moved in opposite directions such that the openings 16a and 16b of the valve casing 16 are closed by the valve plates 1 and 1A, and wherein the relationship between the pressure of the openings 16a and 16b is Pa=Pb.

Figure 16:
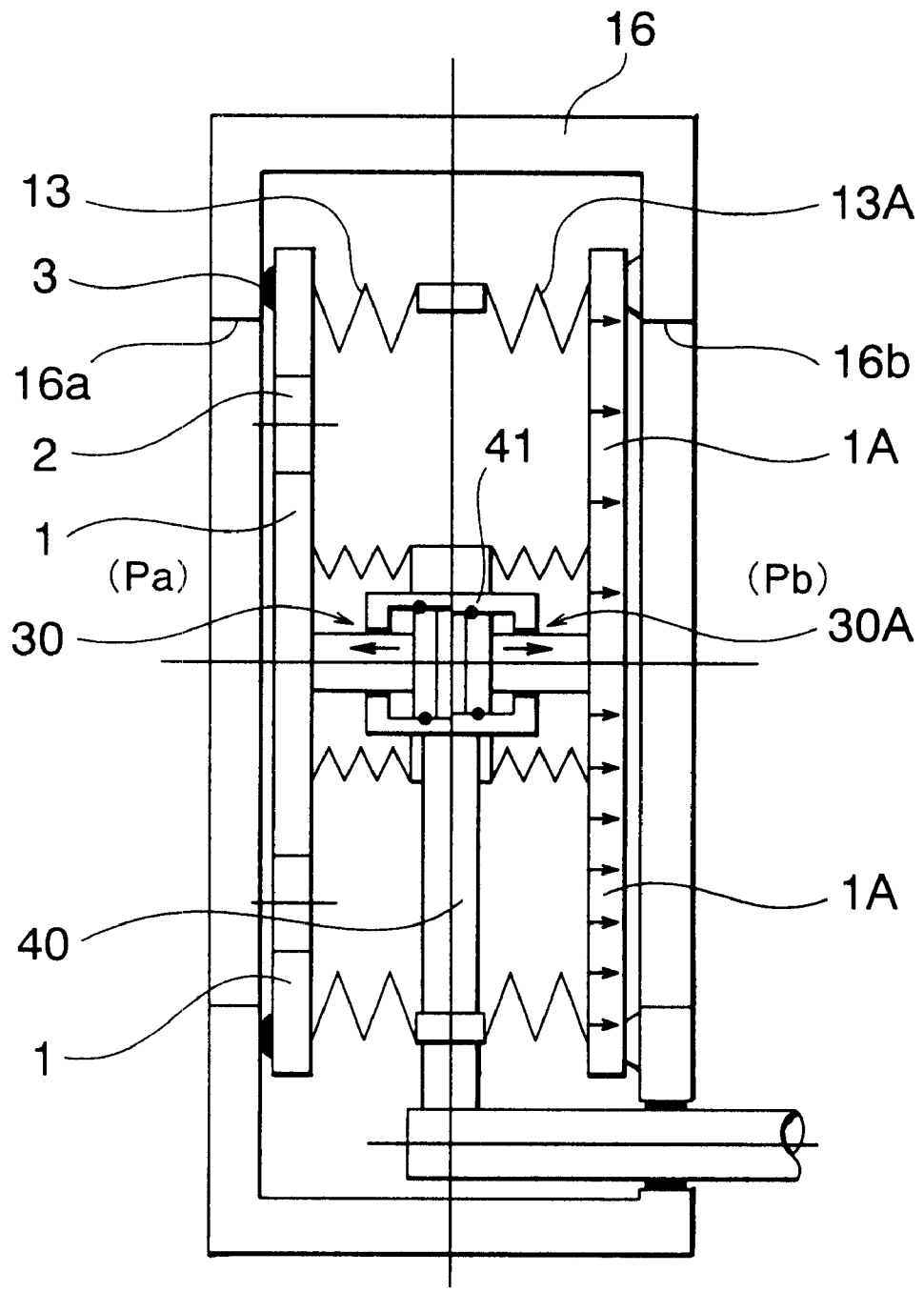
FIG. 16 is a cross sectional view showing a case of differential pressure sealing of the present invention in FIG. 14.

FIG. 16 shows a case of differential pressure sealing, wherein the pressure of the openings 16a and 16b is under the condition Pa>Pb.

Figure 17:
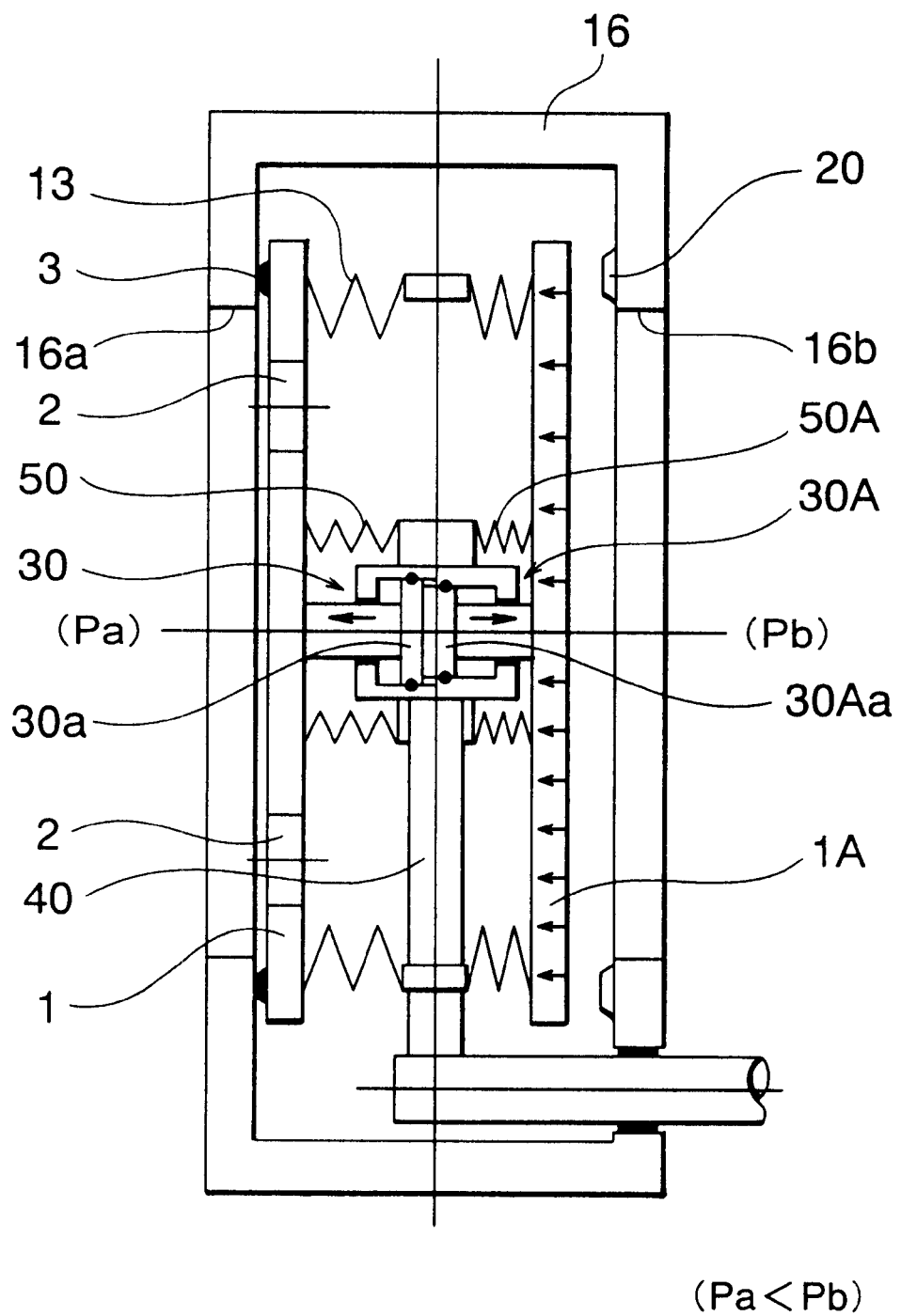
FIG. 17 is a cross sectional view showing a case of differential pressure sealing of the present invention in FIG. 14.

FIG. 17 shows a structure opposite to that shown in FIG. 16, showing a case of the differential pressure sealing, wherein the pressure of the openings 16a and 16b of the valve casing 16 is under the condition Pa<Pb.

Figure 18:
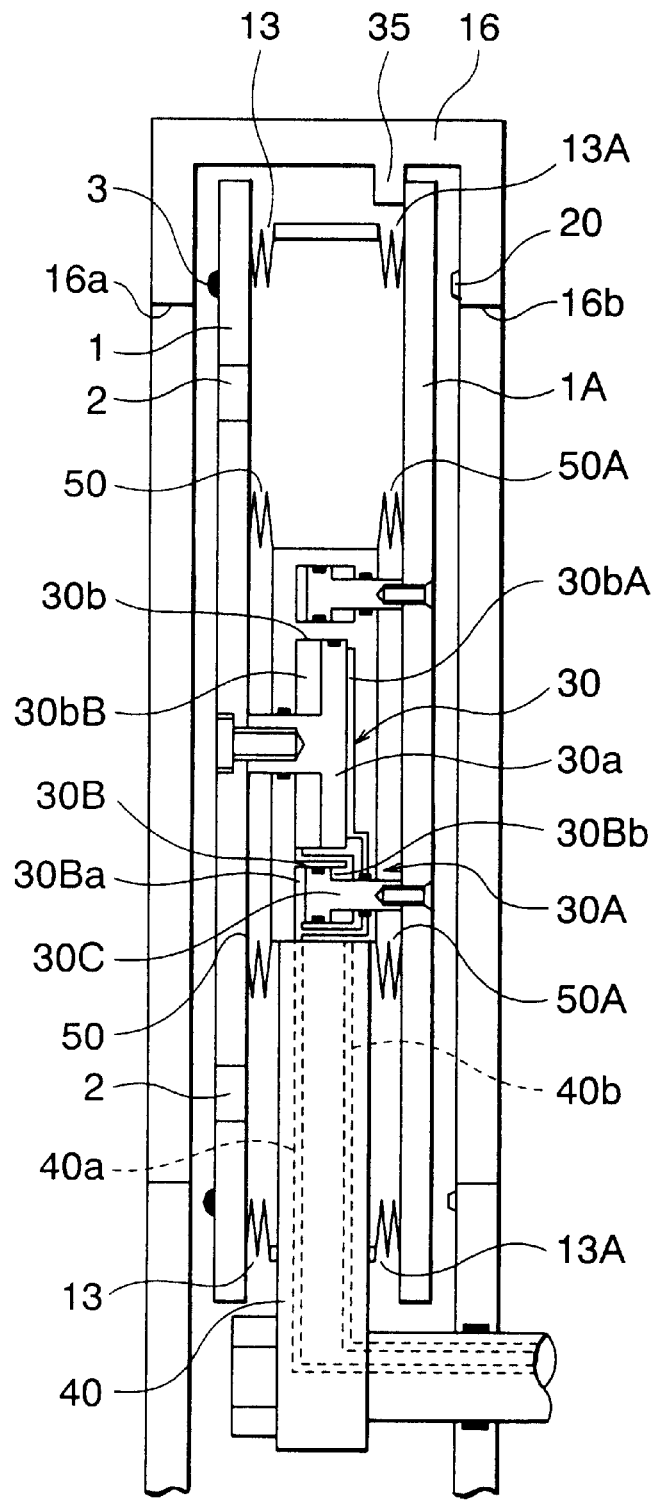
FIG. 18 is a cross sectional view of another embodiment of the present invention in FIG. 14.

Although FIGS. 14 to 17 show cases where the cylinders of the actuators 30 and 30A are connected in series, the cylinders may be divided and arranged in parallel as shown in FIG. 18 and thereby the thickness of the entire valve casing 16 can be significantly reduced. Parts similar to those in the previously described structure are given the same reference numerals and a description thereof is omitted.

In the first valve plate 1, the first piston 30a of the first actuator 30 is constructed so as to be operated in a first cylinder 30b, and a first piping 40a and a second piping 40b of the pipe body 40 are connected to a first chamber 30bA and a second chamber 30bB of the first cylinder 30b, respectively.

The first actuator 30 is provided with a ring-shaped second actuator 30A in parallel with the first actuator 30 on the outside thereof, and the second actuator 30A is provided with a ring-shaped second piston 30C, which is connected to the second valve plate 1A, in a second cylinder 30B in a manner which allows it to be freely operated. The first piping 40a and the second piping 40b are connected to a first chamber 30Ba and a second chamber 30Bb of the second cylinder 30B.

Accordingly, in the above described structure, when the pressure is applied in the second chambers 30bB and 30Bb in FIG. 18, the openings 16a and 16b are opened, and when the pressure is applied in the first chambers 30bA and 30Ba, the valve plates 1 and 1A are moved toward the outside so that the openings 16a and 16b are closed. In addition, in the structure in FIG. 18, although the second actuator 30A has a ring shape, the cylinders may separately be disposed on the outside of the first actuator 30.

Since the gate valve according to the present invention is constructed as described above, the following advantages can be provided:

When the pressure of the first opening of the valve casing is higher than that of the second opening, the valve plate 1 can cancel the force which is generated due to the differential pressure and which serves as resistance against a sealing force, the force conventionally required for opening and closing the valve can be remarkably reduced, and the rigidity of the valve plates 1 and 1A can also be remarkably reduced, thereby allowing the valve to be made lightweight.

Also, the amount by which the actuator provided between the pair of valve plates is required to open and close the valve can be significantly reduced, thereby enabling the valve to be made small and lightweight.

Accordingly, the valve rod merely moves the valve plate assembly vertically or moves in a pendular motion, and is not required to support the force for opening and closing the valve by the actuator, and the valve plate assembly can be made lightweight. Consequently, there is no need for the valve to use a complicated, highly rigid and heavy mechanism as in the conventional art, and the valve driving section can be remarkably simplified and made lightweight, thereby decreasing the cost and improving reliability and the ability to perform maintenance.

What is claimed is:

1. A gate valve, comprising:
    a first valve plate having a valve opening;
    a second valve plate connected to said first valve plate via an expandable body; and
    an actuator provided between said first valve plate and said second valve plate,
    wherein said first valve plate and said second valve plate are both operative to be moved by the actuator away from each other or toward each other.

2. A gate valve according to claim 1, wherein said first valve plate is provided with a valve rod.

3. A gate valve according to claim 1, wherein said second valve plate is provided with a valve rod.

4. A gate valve according to claim 1, wherein a valve rod is located at the center of the expandable body in the axial direction.

5. A gate valve according to claim 1, wherein said actuator comprises an air cylinder.

6. A gate valve according to claim 1, wherein said actuator is surrounded by dustproof bellows provided between the valve plates.

7. A gate valve according to claim 5, wherein said air cylinder comprises:
a piston provided at the valve plates;
a piston rod; and
a cylinder,
wherein a pressure medium is supplied to a space formed between the piston and the cylinder.

8. A gate valve according to claim 1, wherein said first valve plate is provided with first sealing member.

9. A gate valve according to claim 1, further comprising:
a valve casing for enclosing said valve plates in such a manner that said valve plates can freely move;
a first valve seat, with which first sealing member come into contact, formed in a first opening of the valve casing; and
a first stopper, with which a second valve plate comes into contact, formed in a second opening of the valve casing.

10. A gate valve according to claim 1, further comprising:
a valve casing for enclosing said valve plates in such a manner that said valve plates can freely move;
a first sealing member, with which said first valve plate comes into contact, formed in the first opening of the valve casing; and
a first stopper, with which said second valve plate comes into contact, formed in the second opening of the valve casing.

11. A gate valve according to claim 1, further comprising:
a valve casing for enclosing said valve plates in such a manner that said valve plates can freely move;
a first valve seat, with which the first sealing member comes into contact, formed in the first opening of the valve casing; and
a second stopper which protrudes from the second valve plate, which is located on the inside or outside of the expandable body, and which comes into contact with the valve casing on the side of the first opening of the valve casing.

12. A gate valve according to claim 1, further comprising:
a valve casing for enclosing the valve plates in such a manner that the valve plates can freely move;
a first valve seat, with which the first sealing member comes into contact, formed in the first opening of the valve casing; and
a second stopper which protrudes from the inner wall of the valve casing, which is located on the outside of the expandable body, and which comes into contact with the first valve plate.

* * * * *